(12) United States Patent
Nakashima et al.

(10) Patent No.: US 6,926,923 B2
(45) Date of Patent: Aug. 9, 2005

(54) METHOD OF FORMING COAT ON INNER SURFACE OF BEARING AND APPARATUS FOR THE SAME

(75) Inventors: Tsuyoshi Nakashima, Inuyama (JP); Takuya Tanaka, Inuyama (JP); Weixing Zhong, Inuyama (JP); Takayuki Shibayama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/645,948

(22) Filed: Aug. 22, 2003

(65) Prior Publication Data

US 2004/0062860 A1 Apr. 1, 2004

(30) Foreign Application Priority Data

Sep. 27, 2002 (JP) ........................................ 2002-283293

(51) Int. Cl.[7] .............................. B05D 7/22; B05B 13/06
(52) U.S. Cl. ........................ 427/233; 427/234; 427/345; 118/318; 118/312; 118/DIG. 10
(58) Field of Search ................................. 118/117, 118, 118/DIG. 10, 312, 323, 317, 318; 427/230–236, 345

(56) References Cited

U.S. PATENT DOCUMENTS

| | | | | |
|---|---|---|---|---|
| 2,565,543 A | * | 8/1951 | Arvintz et al. ............... | 392/495 |
| 3,797,456 A | * | 3/1974 | Hogstrom .................... | 118/316 |
| 3,816,165 A | * | 6/1974 | Horvath et al. .............. | 427/236 |
| 4,606,942 A | * | 8/1986 | Shriver et al. ............... | 427/233 |
| 6,060,554 A | * | 5/2000 | Mitsuji et al. ............... | 524/515 |

FOREIGN PATENT DOCUMENTS

JP      A-2001-304264      10/2001

* cited by examiner

*Primary Examiner*—Chris Fiorilla
*Assistant Examiner*—Yewebdar Tadesse
(74) *Attorney, Agent, or Firm*—Rader, Fishman & Grauer PLLC

(57) ABSTRACT

There is provided a method of forming a coat on an inner surface of a bearing, in which a jig 13 is attached to a rotor 2 while holding four bearings 12 for example, so as to form those in a cylinder shape. Then, while the rotor 2 is rotated at a circumferential speed of 0.3 m/sec, a nozzle 8 for airless spraying is inserted into the rotor 2, so that the nozzle 8 injects a coating material 30 from the inside of the bearings 12 toward an inner surfaces of the bearings 12 to apply the coating material thereon. Because the coating material 30 is injected from the nozzle 8 without using compressed air, the fly amount of the coating material is made less as compared to air spray painting.

20 Claims, 4 Drawing Sheets

METHOD OF FORMING COAT ON INNER SURFACE OF BEARING AND APPARATUS FOR THE SAME

CROSS-REFERENCE TO RELATED APPLICATIONS

This application claims priority based on Japanese Patent Application No. 2002-283293, filed Sep. 27, 2002, the entirety of which is incorporated herein by reference.

BACKGROUND OF THE INVENTION

1. Field of the Invention

The present invention relates to a method of forming a coat on an inner surface of a bearing having a cylinder shape and an apparatus for forming the coat.

2. Description of the Prior Art

Conventionally, for the purpose of improving conformability and anti-seizure property, a synthetic resin coat has been formed on an inner surface of a half bearing having a semi-cylinder shape, for example. The coat often includes a base resin made of a synthetic resin in which a solid lubricant is contained. As a method of forming such a coat, there have been known a plurality of methods as follows.

(1. Air Spray Method)

As shown in FIG. 4, in the case of a half bearing for example, while two half bearings 101 are held by a jig (not shown) to be combined into a cylinder shape and while the bearings 101 are rotated in their circumferential direction together with the jig, a coating material 103 (a mixture of a base resin and a solid lubricant) for forming a coat is injected from diagonally above the bearings 101 (approximately at 45 degree from above the bearings 101) toward an inner surface of each bearing 101 using a nozzle 102 by the air spray method, to apply the coating material thereon. Then, the jig is turned upside down, and the coating material is applied also from the opposite side in the same manner. Thereafter, the base resin is cured.

(2. Printing Method)

A coating material for forming a coat is applied on a printing surface of a pad, then the printing surface is pressed onto an inner surface of a bearing to transfer the coating material thereon. Thereafter, the coating material is cured.

(3. Immersion Method)

A bearing is directly immersed in a coating material to deposit the coating material on an inner surface of the bearing, and then the bearing is drawn from the coating material and undergoes curing.

(4. Roll Coat Method)

A coating material for forming a coat is dropped on a transfer roll, and the transfer roll and a printing roll are rotatably contacted with each other to transfer the coating material on the printing roll. Then, a bearing (a back plate) having a semi-cylinder shape is engaged between the printing roll and a backup roll such that an inner surface of the bearing contacts with the printing roll to apply the coating material on the inner surface of the bearing. Thereafter, the coating material is cured (see page 4 and FIGS. 2 and 3 of JP-A-2001-304264, for example).

BRIEF SUMMARY OF THE INVENTION

However, each of the above described methods has the following disadvantages.

In the case of the air spray method, since the method adopts atomizing the coating material by using compressed air, the coating material flies in all directions. Therefore, the yield percentage of the coating material is low, and the working conditions are made bad.

In the case of the printing method, since the coating material is pressed onto a surface to transfer the coating material thereon, the dimensional accuracy of the coat thickness is low.

In the case of the immersion method, it is difficult to control the concentration of the solid lubricant to be mixed in the coating material.

In the case of the roll coat method, because of a change in viscosity of the coating material, a dimension of the coat thickness tends to be varied, and therefore the dimensional accuracy is low.

The present invention was achieved in consideration of the above circumstances, and a first object thereof is to provide a method of forming a coat on an inner surface of a bearing, by which the yield of the coating material and the working conditions can be improved as compared to the air spray method, the concentration of the coating material can be readily controlled as compared to the immersion method, and the dimensional accuracy of the coat thickness can be improved as compared to the printing method and the roll coat method. In addition, a second object of the invention is to provide an apparatus for forming a coat on an inner surface of a bearing to achieve the above object.

In order to achieve the first object described above, according to a first aspect, the invention is characterized in that, in a method of forming a coat on an inner surface of a bearing having a cylinder shape, while rotating the bearing in its circumferential direction, injecting a coating material for forming the coat from a nozzle by airless spray painting, to apply the coating material on the inner surface of the above described bearing.

According to the above described method, because the coating material is injected from the nozzle by the airless spray painting and compressed air is not used in contrast to air spray painting, the coating material flying in all direction is less, the yield percentage of the coating material is improved, and the working conditions are also improved. In addition, in the case of the airless spray painting, the coating material can be applied from a nearer point to a work as compared to the air spray painting. Further, because of spray painting, the concentration of the coating material can be readily controlled as compared to the immersion method. Furthermore, because it is possible to stack thin film by the spray painting, the dimensional accuracy of the coat thickness can be improved as compared to the printing method and the roll coat method.

In this case, it is preferred that the rotational speed of the bearing in applying the coating material is set to be the circumferential speed of 0.2 m/sec or more (a second aspect). As the rotational speed is higher, the thickness of the coat, which is applied at one time, can be made thin and the accuracy of the dimension can be further improved.

Further, it is preferred that the nozzle is inserted inside the bearing and thereby the coating material is injected from the inside of the bearing (a third aspect). According to the aspect, because the coating material is injected from the inside of the bearing to be applied on the inner surface thereof, the coating material can be applied on the entire inner surface of the bearing at one time, which can improve the yield percentage thereof, productivity, and the working conditions as compared to the case of injecting the coating material from the outside of the bearing to be applied on the surface.

It is also preferred that the pressure in injecting the coating material from the nozzle is 1 to 10 MPa (a forth aspect). If the pressure is less than 1 MPa, it becomes difficult to atomizing the coating material when injecting that. If the pressure is above 10 MPa, a fly amount is larger, and the working conditions are deteriorated.

In a coating material supplying means for supplying the coating material to a nozzle, it is preferred that the coating material is circulated in a sealed state (a fifth aspect). According to the aspect, it is possible to further stabilize the concentration of the coating material.

In order to achieve the above described second object, according to a sixth aspect, the invention is characterized in that, in an apparatus for forming a coat on an inner surface of a bearing having a cylinder shape, the apparatus comprises: a rotating means for rotating the bearing in its circumferential direction; an applying means consisting of a nozzle for applying a coating material to form the coat on the inner surface of the bearing by injecting the coating material by airless spray painting; and a coating material supplying means for supplying the coating material to the nozzle while applying pressure to the coating material in a sealed state and circulating the coating material.

In the above described arrangement, when the coat is formed on the inner surface of the bearing, while rotating the bearing by the rotating means, the coating material supplied by the coating material supplying means is injected from the nozzle toward the inner surface of the bearing by the airless spray painting, so that the coating material is applied on the inner surface. According to this arrangement, the advantageous effects similar to those of the invention defined by the first aspect can be obtained.

In this case, it is preferred that the nozzle is adapted to be inserted into an inner side of the bearing to inject the coating material from the inner side of the bearing (a seventh aspect). According to the aspect, as in the case of the invention defined by the third aspect, it is possible to apply the coating material on the entire inner surface of the bearing at one time, which can improve the yield percentage, productivity, and working conditions as compared to the case when the coating material is injected from the outside of the bearing so as to be applied on the inner surface.

In addition, in the invention defined by the seventh aspect, it is preferred that the nozzle can reciprocate along an axial direction of the bearing (an eighth aspect). According to the aspect, it is possible to apply the coating material on a plurality of bearings at one time by injecting the coating material while the plurality of bearings are aligned in the axial direction and the nozzle is reciprocated in the axial direction, which can further improve the yield percentage and the productivity.

According to a ninth aspect, the invention is characterized in that the rotating means comprises a jig for holding the bearing and a rotor to which the jig is attached, the rotor rotating with the jig. Further, the jig comprises a first jig of a semi-cylinder shape having, on its inner surface side, a bearing receiving surface for receiving the bearing and a second jig having, on its inner surface side, a bearing receiving surface opposite to the bearing receiving surface of the first jig, the second jig having a semi-cylinder shape of which outer diameter is larger than that of the first jig, and being attached to the rotor while holding the bearing between the first and second jigs.

According to this arrangement, it is possible to easily attach the bearing to the rotor.

Other objects, features, and advantages of the present invention will be apparent from the following descriptions of embodiments of the invention with reference to the appended drawings.

BRIEF DESCRIPTION OF THE DRAWINGS

The present invention will now be described, by way of example, with reference to the accompanying drawings, in which.

DETAILED DESCRIPTION OF THE INVENTION (Embodiment 1)

Figure 1:
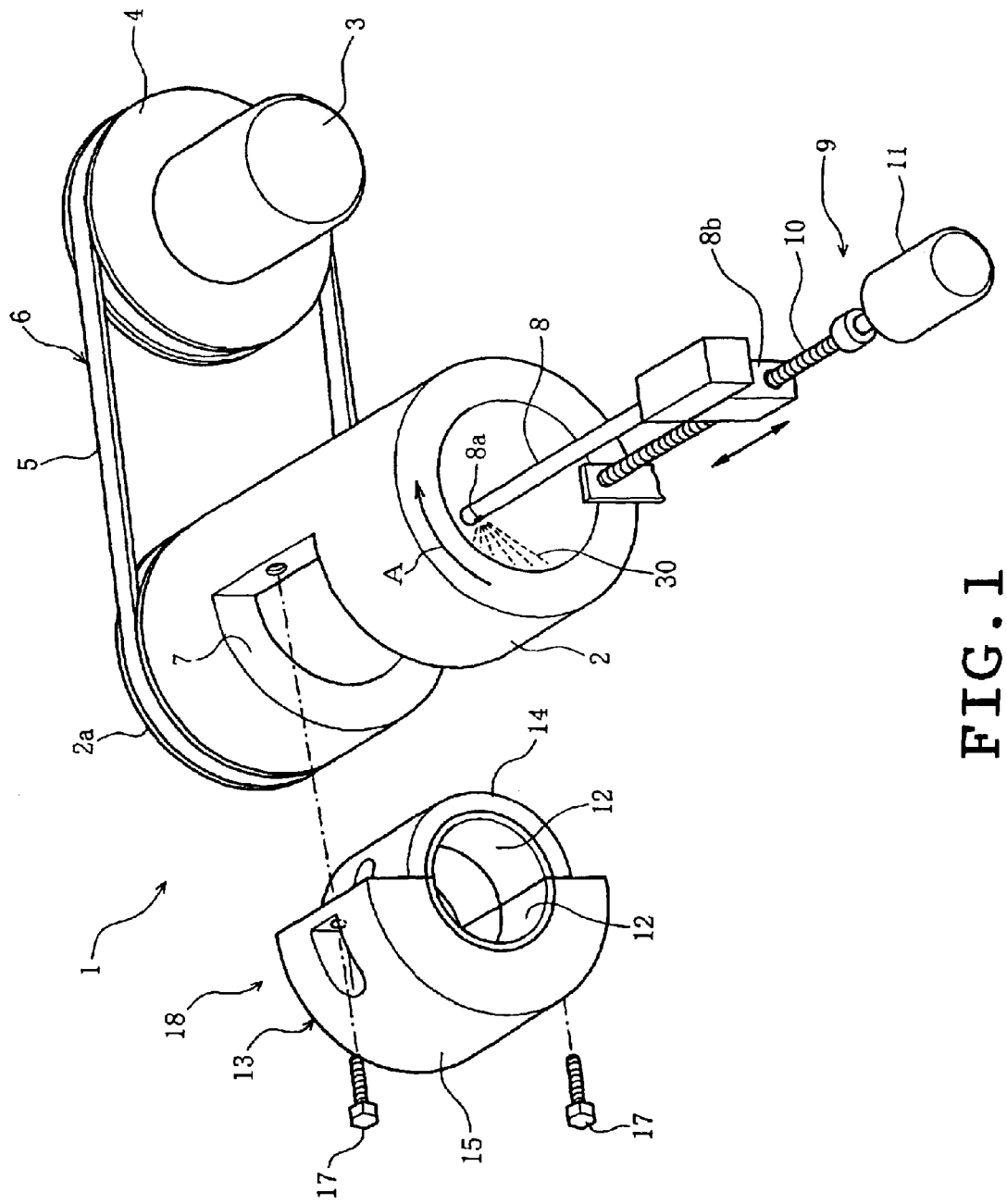
FIG. 1 is a schematic perspective view of an embodiment showing a principle of an apparatus for forming a coat according to the present invention.

Firstly, FIG. 1 shows a principle arrangement of a coat forming apparatus 1 for forming a coat on an inner surface of a bearing. In FIG. 1, a rotor 2 having a cylinder shape is supported so as to be rotatable about its axis, and a driven pulley 2a which is rotated together with the rotor 2 is mounted on one end of the rotor 2. A driving pulley 4 is mounted on a rotating axis of a rotor motor 3 for rotating the rotor 2. A belt 5 is bridged between the driving pulley 4 and the driven pulley 2a to constitute a belt transmission mechanism 6. Therefore, by rotating the rotor motor 3, the rotor 2 is rotated via the belt transmission mechanism 6 in a direction of an arrow A, for example.

An opening portion 7 having a semi-arc shape is formed in a circumferential wall part of the rotor 2. On the other end side (the opposite side to the driven pulley 2a) of the rotor 2, a nozzle 8 (an applying means) for airless spraying is placed, and an electrically driven slide mechanism 9 is provided also on the same side for reciprocating the nozzle 8 along the axial direction of the rotor 2. The nozzle 8 is formed so as to extend in the axial direction of the rotor 2 and has a spraying port 8a at its tip end.

The electrically driven slide mechanism 9 includes a ball screw 10 extending along the axial direction of the rotor 2, a sliding motor 11 consisting of a reversibly rotatable stepping motor for rotating the ball screw 10, and a slide part 8b of a nut shape which is provided at the bottom of the nozzle 8 and screwed on the ball screw 10. By rotating the ball screw 10 by the sliding motor 11, the nozzle 8 is moved along the axial direction of the rotor 2. By rotating the slide motor 11 in a reverse direction, the nozzle 8 is moved in an opposite direction.

Figure 2:
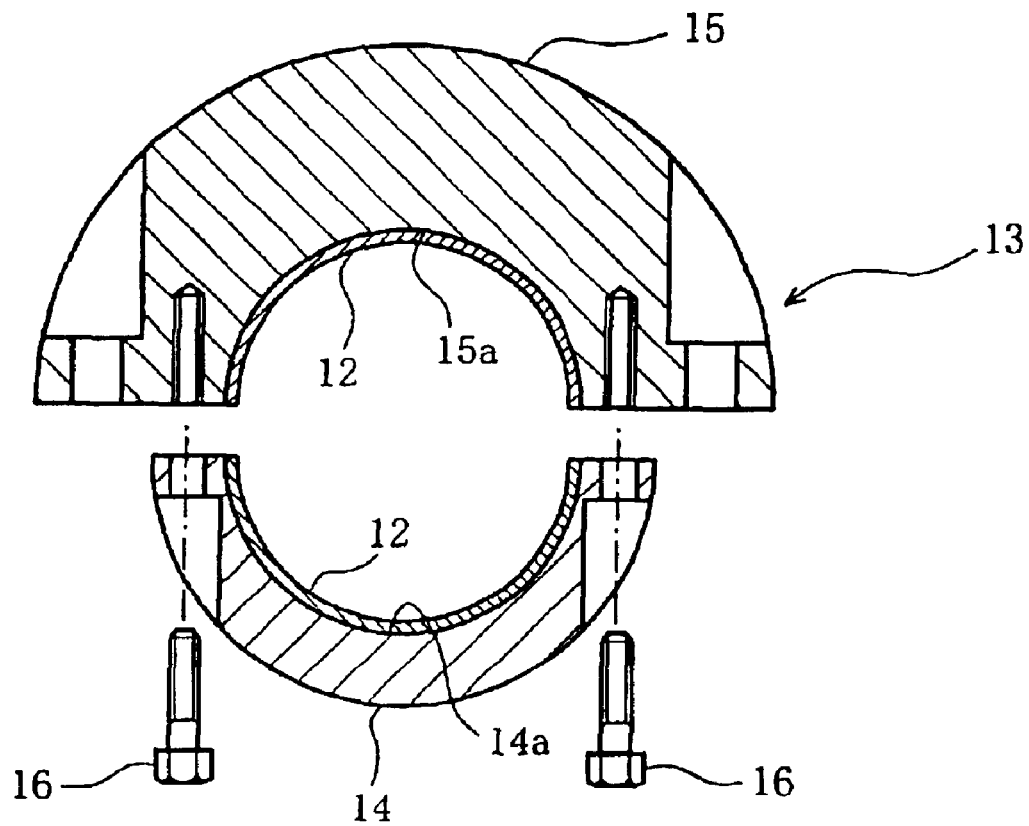
FIG. 2 is a sectional view showing a state where a bearing is attached to a jig.

A jig 13 for holding the bearing 12 is, as shown also in FIG. 2, composed of a first jig 14 having a semi-cylinder shape and a second jig 15 having a larger outer diameter than that of the first jig 14. Inner surfaces of the first and second jigs 14, 15 are formed to provide bearing receiving surfaces 14a, 15a for receiving the bearing 12 consisting of half bearings having semi-cylinder shapes. The first jig 14 is attached to the second jig 15 with bolts 16, and the second jig 15, which is integrated with the first jig 14 as shown in FIG. 1, is attached to the rotor 2 with bolts 17 such that the first jig 14 is inserted into the opening portion 7 of the rotor 2. Therefore, by holding two or four bearings 12 having semi-cylinder shapes by the jig 13 so as to be formed into a cylinder shape and then attaching the jig 13 to the rotor 2, the bearings 12 are rotated in a circumferential direction thereof together with the rotor 2. In this case, the rotor 2, the rotor motor 3, the belt transmission mechanism 6, and the jig 13 constitute a rotating means 18 for rotating the bearings 12 in the circumferential direction.

Figure 3:
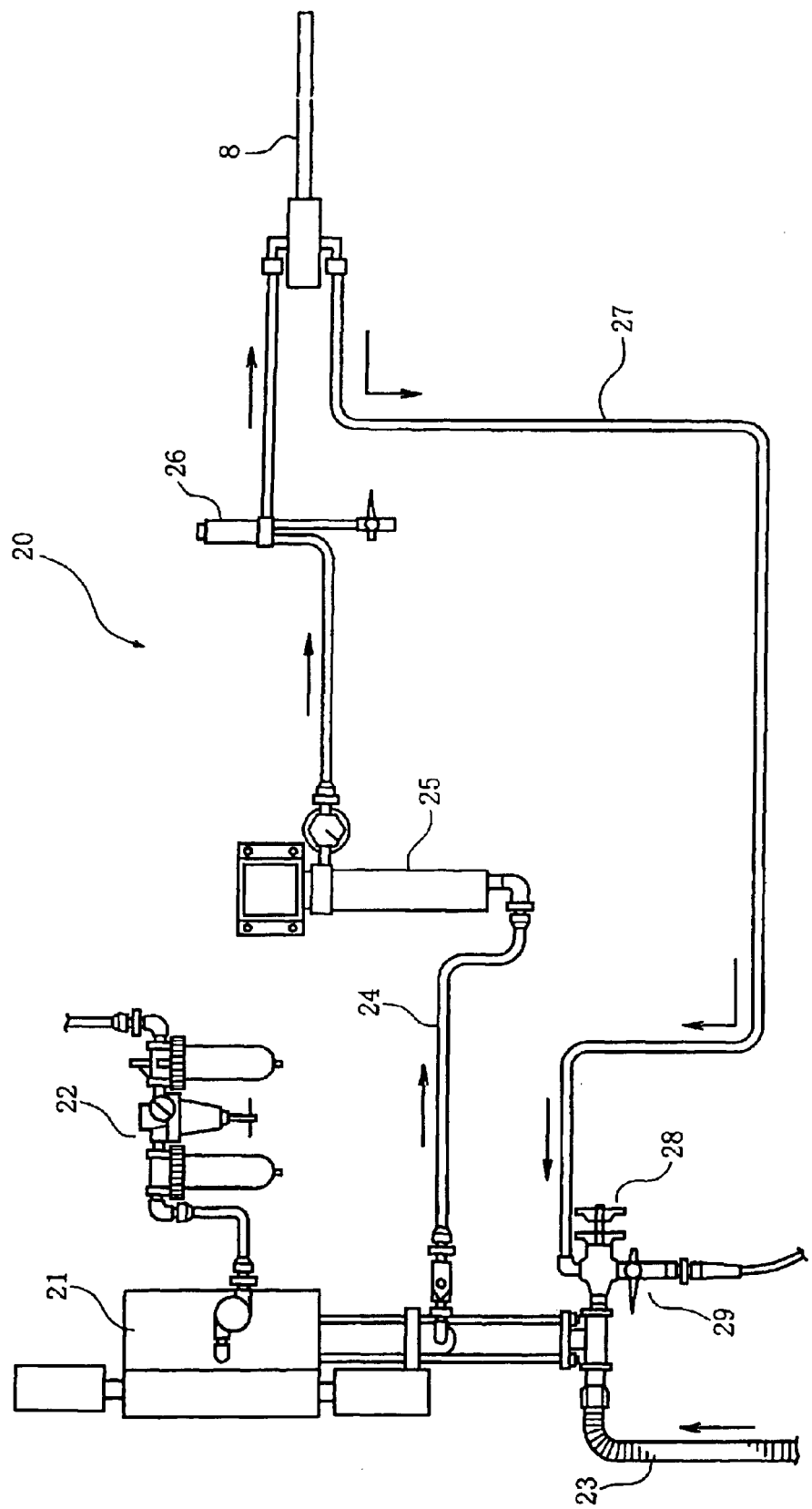
FIG. 3 is a view showing an arrangement of a coating material supplying apparatus.

Next, in FIG. 3, a coating material supplying apparatus 20 for supplying a coating material for forming the coat to the above described nozzle 8 is shown. The coating material supplying apparatus 20 constitutes a coating material supplying means according to the present invention. A pump 21 is driven by air which is controlled by an air regulator 22, and discharges the coating material (a liquid which is made by mixing a base resin and a solid lubricant) supplied from a coating material supplying passage 23, under a high pressure (1 to 10 MPa, preferably approximately 5 MPa), toward a supplying passage 24. A base end of the coating material supplying passage 23 is connected to a tank (not shown) in which the coating material is stored.

In this case, the following material is used as a coating material for forming the coat. A solid material containing 60 volume % of a base resin such as polyamide imide (PAI) and 40 volume % of a solid lubricant such as molybdenum disulfide ($MoS_2$) is diluted by an organic solvent made by mixing dimethylacetamide (DMAC) and n-methyl-2-pyrrolidone (NMP) so that the solid material is 25 mass % with respect to the whole coating material. As a solid lubricant, graphite (Gr) or polytetrafluoroethylene (PTFE) may be used instead of $MoS_2$.

On the supplying passage 24, a heater 25 for heating the coating material and a filter 26 are provided. A tip end of the supplying passage 24 is connected to a coating material inlet port of the nozzle 8. A return passage 27 is connected to a coating material return port of the nozzle 8 and the tip end of the return passage 27 is connected to a circulation valve 28. The circulation valve 28 is connected to the above described coating material supplying passage 23. In addition, a drain valve 29 is provided in the vicinity of the circulation valve 28.

When a coating material under a high pressure generated by the pump 21 is supplied to the nozzle 8, a part of the coating material is injected from the spraying port 8*a* of the nozzle 8, and the remaining coating material is circulated so that it passes through the return passage 27 and the pump 21 and returns again to the supplying passage 24. Therefore, the coating material supplying apparatus 20 supplies the coating material to the nozzle 8 while applying a pressure thereto in a sealed state and while circulating the coating material therein.

Now, processes in forming a coat on the bearing 12 will be described.

Firstly, the bearing 12 produced in the following manner is used. Thus, a bearing alloy layer is bonded onto a steel plate which is as a back plate, and then it is machined into a predetermined bearing shape (a semi-cylinder shape). Thereafter, degreasing process is performed, and then a surface of the bearing alloy layer is roughened by blasting process. Further, after cleaning it with acid, and then with hot water, it is dried. Dimensions of the bearing 12 are as shown in Table 1.

TABLE 1

| | Sample Dimension (mm) |
|---|---|
| Bearing Width | 20 |
| Bearing Inner Diameter | 50 |
| Alloy Thickness | 1.5 |

The bearings 12 formed in such a manner are attached to the jig 13 so that two bearings are combined to form a cylinder shape. In this case, for example, four bearings 12 are attached to a set of jigs 13. Then, the whole jig 13 is heated. The temperature in this time is 40 to 150° C., preferably approximately 80° C.

Then, the jig 13 is attached to the opening portion 7 of the rotor 2 by using the bolt 17, as shown in FIG. 1. In this state, the rotor 2, as well as the bearings 12 are rotated by the rotor motor 3 in a direction of an arrow A which is a circumferential direction of the bearing while the nozzle 8 is slid by the electrically driven slide mechanism 9 so as to be inserted into the rotor 2. At that time, the nozzle 8 is situated so that the tip end of the nozzle 8 is located inside the bearings 12. Then, while the rotor 2 and the bearings 12 are rotated at a rotational speed which is a circumferential speed of 0.2 m/sec or more, for example 0.3 m/sec, a coating material 30 (see FIG. 1) is injected from the spraying port 8*a* of the nozzle 8 toward the inner surfaces of the bearings 12, to apply the coating material thereon. At the same time, the nozzle 8 is slid in an axial direction. At that time, the coating material 30 is injected in a perpendicular direction from an inner side of the bearing 12 toward the inner surfaces of the respective bearings 12 to form a coat in a manner that thin films are stacked. In Embodiment 1, the thickness of the coat to be formed is 5 µm. The thickness of the coat can be controlled by the rotational speed of the rotor 2, the injection amount of the coating material from the nozzle 8, the sliding speed of the nozzle 8, and the injecting time.

After applying the coating material, the jig 13 is removed from the rotor 2 and the bearings 12 undergo curing for 60 minutes at a temperature of 150 to 400° C., preferably approximately 350° C. In this manner, the coating material is cured and the coat of a synthetic resin containing a solid lubricant is formed on the inner surfaces of the bearings 12.

(Embodiment 2)

Embodiment 2 is basically similar to Embodiment 1, except for the following. Namely, a rotor 2 and a jig 13 for holding a bearing 12 in a coat forming apparatus are extended in an axial direction and forty bearings 12 are attached to the jig (not shown). In addition, the nozzle 8 is significantly moved in the axial direction so that a coating material 30 can be applied onto the bearings 12. In this manner, the coating material 30 is applied onto the forty bearings 12 at one time to form the coat thereon.

COMPARATIVE EXAMPLE

In this Comparative Example, a coating material is applied by air spray painting. Concretely, the following processes were performed.

Figure 4:
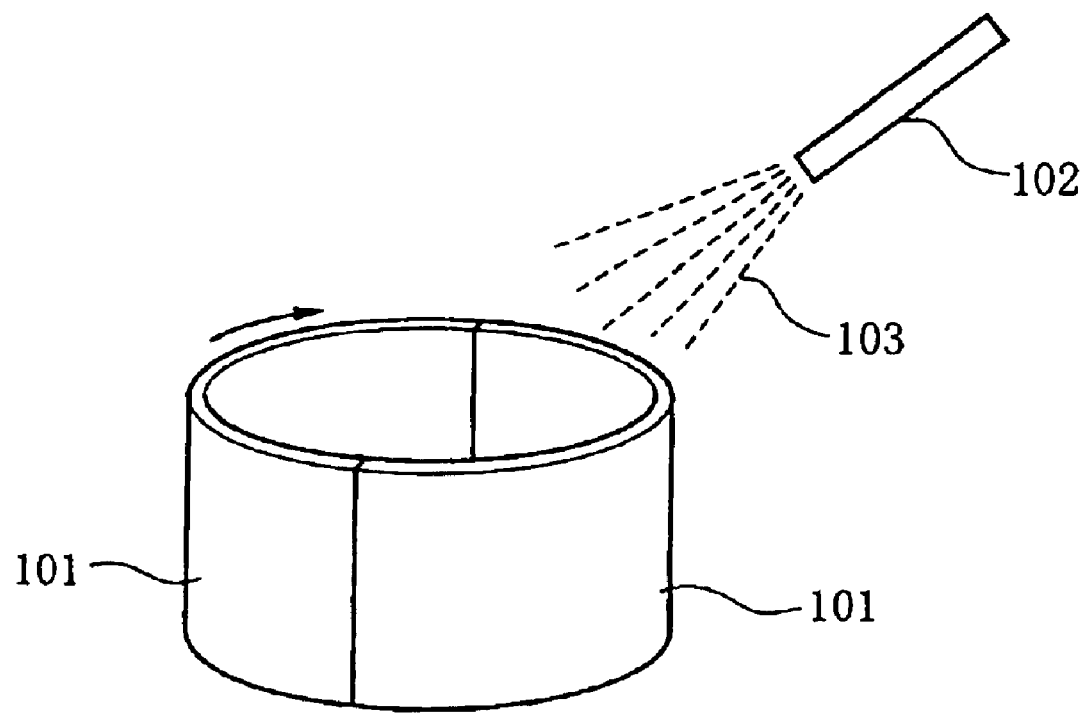
FIG. 4 is a perspective view showing an example of conventional air spray painting.

Four bearings formed in a similar manner to Embodiment 1 are attached to the jig (not shown) to form a cylinder shape and heated to approximately 80° C. The bearings having same dimensions as those in FIG. 1 are used in the example. Then, while the whole jig is attached to the rotor (not shown) and the bearing is rotated together with the rotor, a coating material 103 for forming a coat (same as the coating material 30 in Embodiment 1) is injected by an air spraying nozzle 102 from diagonally above the bearing toward an inner surface thereof, to apply the coating material on the surface, as shown in FIG. 4. Then, the jig is turned upside down and the coating material is applied from the opposite side in the similar manner, and thereafter cured. In this case, the rotational speed of the bearing was set to be a circumferential speed of 0.06 m/sec.

(Results of comparing Embodiments 1 and 2 with Comparative Example)

By measuring changes in mass of the bearings before and after applying the coats (a resin composition product)

formed according to Embodiments 1 and 2 and Comparative Example, the yield percentages of the coating materials are determined, which results are shown in Table 2. The yield percentages of the coating materials are calculated according to the following formula:

$$Y\ (\%) = \frac{(Wt2 - Wt1) \times N\ (g)}{Wtd\ (g)} \times 100$$

wherein "Y" denotes a yield percentage, "Wt1" denotes weight of a bearing before curing, "Wt2" denotes weigh of the bearing after curing, "Wtd" denotes discharging amount of weight of a coating material (solid), and "N" denotes number of bearings to be mounted.

TABLE 2

|  | Number of Bearings | Yield Percentage (%) |
| --- | --- | --- |
| Embodiment 1 | 4 | 60 |
| Comparative Example | 4 | 25 |
| Embodiment 2 | 40 | 90.6 |

From Table 2, the followings are obtained. Firstly, in comparing Embodiment 1 with Comparative Example, both cases have same numbers (that is, four) of bearings to be mounted. However, in respect of the yield percentages, Comparative Example results in 25 yield percent while Embodiment 1 results in 60 yield percent, therefore it is found that Embodiment 1 is superior to Comparative Example.

Next, in comparing Embodiments 1 with 2, the number of the bearings to be mounted is four in Embodiment 1 while it is forty in Embodiment 2, which means that the numbers of bearings which can be applied at one time are significantly different from each other. Therefore, it is found that the yield percentage of Embodiment 2 is high (90.6%) and Embodiment 2 is more effective as compared to Embodiment 1.

According to Embodiments 1 and 2 of the present invention, the following advantageous effects can be obtained.

Firstly, because the coating material 30 is injected from the nozzle 8 by the airless spray painting and thus compressed air is not used in contrast to the air spray painting, the flying (or littering) coating material is made less, the yield percentage of the coating material and the efficiency of depositing are improved, and the working conditions are also improved.

In addition, because of spray painting, the concentration of the coating material 30 can be readily controlled as compared to the immersion method. Particularly, because the coating material supplying apparatus 20 supplies the coating material 30 to the nozzle 8 while circulating the coating material 30 in a sealed state, the control of the concentration of the coating material 30 can be further facilitated. Further, because the coating material 30 is applied by the spray painting while rotating the bearing 12 at a high speed, thin films can be stacked thereon and the accuracy of the dimension of the coat thickness can be improved as compared to the printing method and the roll coat method.

Further, because the nozzle 8 is inserted inside the bearing 12 to inject the coating material 30 from the inside of the bearing 12, the coating material 30 can be applied on the entire inner surface of the bearing 12 at one time, which can improve the yield percentage, productivity, and working conditions as compared to the case when the coating material is injected from the outside of the bearing to be applied on the surface.

Particularly, in Embodiment 2, it is possible to apply the coating material 30 on a great number of bearings 12 at one time by injecting the coating material 30 while the great number of bearings 12 are aligned in the axial direction and while the nozzle 8 is reciprocated in the axial direction, which can further improve the yield percentage and the productivity.

Although the above description has been explained in respect to the embodiments, it is apparent for those skilled in the art that the present invention is not limited to the description and various changes and modifications can be made within the spirit of the present invention and the scope of the appended claims. For example, the intended bearing is not limited to the half bearing 12 having a semi-cylinder shape, and may be a bearing (bushing) solely having a cylinder shape.

What is claimed as new and desired to be protected by Letters Patent of the United States is:

1. A method of forming a coat on an inner surface of a bearing, including the steps of:

rotating the bearing in its circumferential direction; and applying a coating material to form the coat on the inner surface of said rotating bearing by injecting the coating material from a nozzle by airless spray painting wherein, the method is performed by an apparatus that includes:

a rotating means for rotating the bearing in its circumferential direction;

an applying means consisting of a nozzle for applying a coating material for forming the coat on the inner surface of said bearing, the applying means injecting the coating material by airless spray painting; and a coating material supplying means for supplying the coating material to said nozzle, the coating material supplying means applying pressure to the coating material in a sealed state and circulating the coating material, said rotating means including a jig for holding said bearing and a rotor to which the jig is attached, the rotor rotating together with the jig, and said jig includes a first jig of a semi-cylinder shape having a bearing receiving surface on an inner surface side thereof for receiving said bearing, and a second up having a bearing receiving surface on an inner surface side thereof, the bearing receiving surface being opposite to said bearing receiving surface of the first up, the second up having a semi-cylinder shape of which outer diameter is larger than that of said first up, and being attached to said rotor while holding said bearing between the first and second jigs.

2. A method of forming a coat on an inner surface of a bearing according to claim 1, wherein the rotational speed of said bearing in said step of applying the coating material is a circumferential speed of 0.2 m/sec or more.

3. A method of forming a coat on an inner surface of a bearing according to claim 1, further including the step of inserting said nozzle into an inner side of the bearing so as to inject said coating material from the inner side of the bearing.

4. A method of forming a coat on an inner surface of a bearing according to claim 2, further including the step of inserting said nozzle into an inner side of the bearing so as to inject said coating material from the inner side of the bearing.

5. A method of forming a coat on an inner surface of a bearing according to any one of claims 1, wherein the pressure applied to the coating material for injecting the material from said nozzle is 1 to 10 MPa.

6. A method of forming a coat on an inner surface of a bearing according to any one of claims 2, wherein the pressure applied to the coating material for injecting the material from said nozzle is 1 to 10 MPa.

7. A method of forming a coat on an inner surface of a bearing according to any one of claims 3, wherein the pressure applied to the coating material for injecting the material from said nozzle is 1 to 10 MPa.

8. A method of forming a coat on an inner surface of a bearing according to any one of claims 4, wherein the pressure applied to the coating material for injecting the material from said nozzle is 1 to 10 MPa.

9. A method of forming a coat on an inner surface of a bearing according to any one of claims 1, further including the step of circulating said coating material in a sealed state in a coating material supplying means for supplying the coating material to said nozzle.

10. A method of forming a coat on an inner surface of a bearing according to any one of claims 2, further including the step of circulating said coating material in a sealed state in a coating material supplying means for supplying the coating material to said nozzle.

11. A method of forming a coat on an inner surface of a bearing according to any one of claims 3, further including the step of circulating said coating material in a sealed state in a coating material supplying means for supplying the coating material to said nozzle.

12. A method of forming a coat on an inner surface of a bearing according to any one of claims 4, further including the step of circulating said coating material in a sealed state in a coating material supplying means for supplying the coating material to said nozzle.

13. A method of forming a coat on an inner surface of a bearing according to any one of claims 5, further including the step of circulating said coating material in a sealed state in a coating material supplying means for supplying the coating material to said nozzle.

14. A method of forming a coat on an inner surface of a bearing according to any one of claims 6, further including the step of circulating said coating material in a sealed state in a coating material supplying means for supplying the coating material to said nozzle.

15. A method of forming a coat on an inner surface of a bearing according to any one of claims 7, further including the step of circulating said coating material in a sealed state in a coating material supplying means for supplying the coating material to said nozzle.

16. A method of forming a coat on an inner surface of a bearing according to any one of claims 8, further including the step of circulating said coating material in a sealed state in a coating material supplying means for supplying the coating material to said nozzle.

17. An apparatus for forming a coat on an inner surface of a bearing, comprising:

a rotating means for rotating the bearing in its circumferential direction;

an applying means consisting of a nozzle for applying a coating material for forming the coat on the inner surface of said bearing, the applying means injecting the coating material by airless spray painting; and a coating material supplying means for supplying the coating material to said nozzle, the coating material supplying means applying pressure to the coating material in a sealed state and circulating the coating material, wherein said rotating means comprises a jig for holding said bearing and a rotor to which the jig is attached, the rotor rotating together with the jig, and wherein said jig comprises a first jig of a semi-cylinder shape having a bearing receiving surface on an inner surface side thereof for receiving said bearing, and a second jig having a bearing receiving surface on an inner surface side thereof, the bearing receiving surface being opposite to said bearing receiving surface of the first jig, the second jig having a semi-cylinder shape of which outer diameter is larger than that of said first jig, and being attached to said rotor while holding said bearing between the first and second jigs.

18. An apparatus for forming a coat on an inner surface of a bearing according to claim 17, wherein said nozzle is adapted to be inserted into an inner side of said bearing to inject the coating material from the inner side of the bearing.

19. An apparatus for forming a coat on an inner surface of a bearing according to claim 17, wherein said nozzle can reciprocate along an axial direction of said bearing.

20. An apparatus for forming a coat on an inner surface of a bearing according to claim 18, wherein said nozzle can reciprocate along an axial direction of said bearing.

* * * * *